United States Patent [19]

Boll, deceased et al.

[11] 4,231,262

[45] Nov. 4, 1980

[54] SYSTEM FOR MEASURING ENTRAINED SOLID FLOW

[75] Inventors: Richard H. Boll, deceased, late of Alliance, Ohio, by United National Bank & Trust Co., executor; Walter L. Ghering, Alliance, Ohio

[73] Assignee: The Babcock & Wilcox Company, New York, N.Y.

[21] Appl. No.: 24,769

[22] Filed: Mar. 28, 1979

[51] Int. Cl.³ .............................................. G01F 1/74
[52] U.S. Cl. ................................................. 73/861.04
[58] Field of Search ...................... 73/195, 205 R, 211, 73/213

[56] References Cited

U.S. PATENT DOCUMENTS 2,984,105  5/1961  Nagel .................................. 73/211 X Primary Examiner—Herbert Goldstein
Attorney, Agent, or Firm—Vytas R. Matas; Joseph M. Maguire

[57] ABSTRACT

A measuring system (10) for measuring the flow of solids ($w_s$) in a fluid stream is disclosed which utilizes only two differential pressure measurements ($\Delta p_1$; $\Delta p_2$) indicating the pressure drop across different points of a venturi (12). The fluid having the solids entrained therein is passed through the venturi (12) and pressure drop measurements are taken at points of the venturi (12). These pressure drop measuurements ($\Delta p_1$; $\Delta p_2$) are transmitted to a microprocessor (15) which calculates these measurements ($\Delta p_1$; $\Delta p_2$) according to a predetermined empirical formula to yield an output signal indicative of the flow of solids ($w_s$) through the venturi (12).

5 Claims, 2 Drawing Figures

SYSTEM FOR MEASURING ENTRAINED SOLID FLOW

TECHNICAL FIELD

The present invention relates to flow measuring systems in general and particularly to flow measuring systems for measuring the flow of entrained solids in a fluid stream.

BACKGROUND ART

Flows comprising particulate solids entrained in fluids such as gases are employed in various industrial and utility processes. An important example is the transport of pulverized coal from a pulverizer to the burner of a utility boiler. Often one pulverizer supplies several burners and flow adjustments are made by visually inspecting the flames issuing into the furnace. Another example is the return of hot partially gassified char from a cyclone separator that follows a coal gassifier back to the bottom of the gassifier.

In both of the aforementioned examples, it is highly desirable to obtain an accurate measurement of the flow rate of the entrained solids. In the case of the pulverizer-coal furnace, the measurement of pulverized coal flow would permit precise and continuous control of the air-to-fuel ratio at each burner. In the case of the gassifier, it would ensure that the separator is functioning properly as well as providing improved process data.

To date, the Applicants are not aware of any practical means for making such measurements. Systems are known such as are disclosed in U.S. Pat. No. 3,408,866, issued to Gibson et al which teach the use of a flow meter for gas-solid suspensions by measuring two pressure drop points in a venturi. However, to obtain mass flow, these known systems utilize a target indicator to measure such solid mass flow. As may be inferred from such prior art systems, the problem is that in a given place both the density and velocity of the flowing mixture are unknown. Furthermore, attempts to measure both of these variables encounter a certain amount of slip between the solid particles and the gases. This phenomenon is documented in articles by Carlson et al, entitled: "METER FOR FLOWING MIXTURES OF AIR AND PULVERIZED COAL", ASME Transactions, February 1948, pages 65-79. This article indicates that entrained particles do not follow the gas acceleration through an orifice so that the pressure drop reading indicates a gas flow rate. However, the particles are supposed not to slip relative to the gas in flowing through the venturi so that its indication gives the density of the flowing mixture once the volumetric flow is obtained from the orifice reading. However, in reality, solid particles actually do accelerate somewhat through the orifice and they do slip in traversing the venturi. Consequently, the meter described therein gives inaccurate readings and is sensitive to particle size.

SUMMARY OF THE INVENTION

The disclosed invention overcomes the problems associated with the known prior art systems as well as others by providing a flow measuring system which measures gas-solid suspensions during flow. To accomplish this, a venturi is used having an elongated throat through which the gas-solid suspension is passed. Two differential pressure transducers are mounted at different positions on the venturi to provide a pressure drop measurement corresponding to the throat pressure drop in a short venturi and the throat pressure drop in a venturi with a longer throat. These two pressure drop signals have been determined to provide an indication of flow of entrained solids independent of solid-to-gas ratio when calculated according to an empirically developed equation. These measured differential pressure signals are calculated in a microprocessor according to the developed equation to thereby provide an output signal indicative of solid flow.

In view of the foregoing, it will be seen that one aspect of the present invention is to provide a flow measuring system for measuring entrained solids in a flow stream.

Another aspect of the present invention is to provide an entrained solid flow measuring system utilizing only two pressure drop signals of a venturi through which the gas-solid flow occurs.

These and other aspects of the present invention will be more fully understood upon a review of the foregoing description of the preferred embodiment when considered in conjunction with the drawings.

DESCRIPTION OF THE PREFERRED EMBODIMENT

Figure 1:
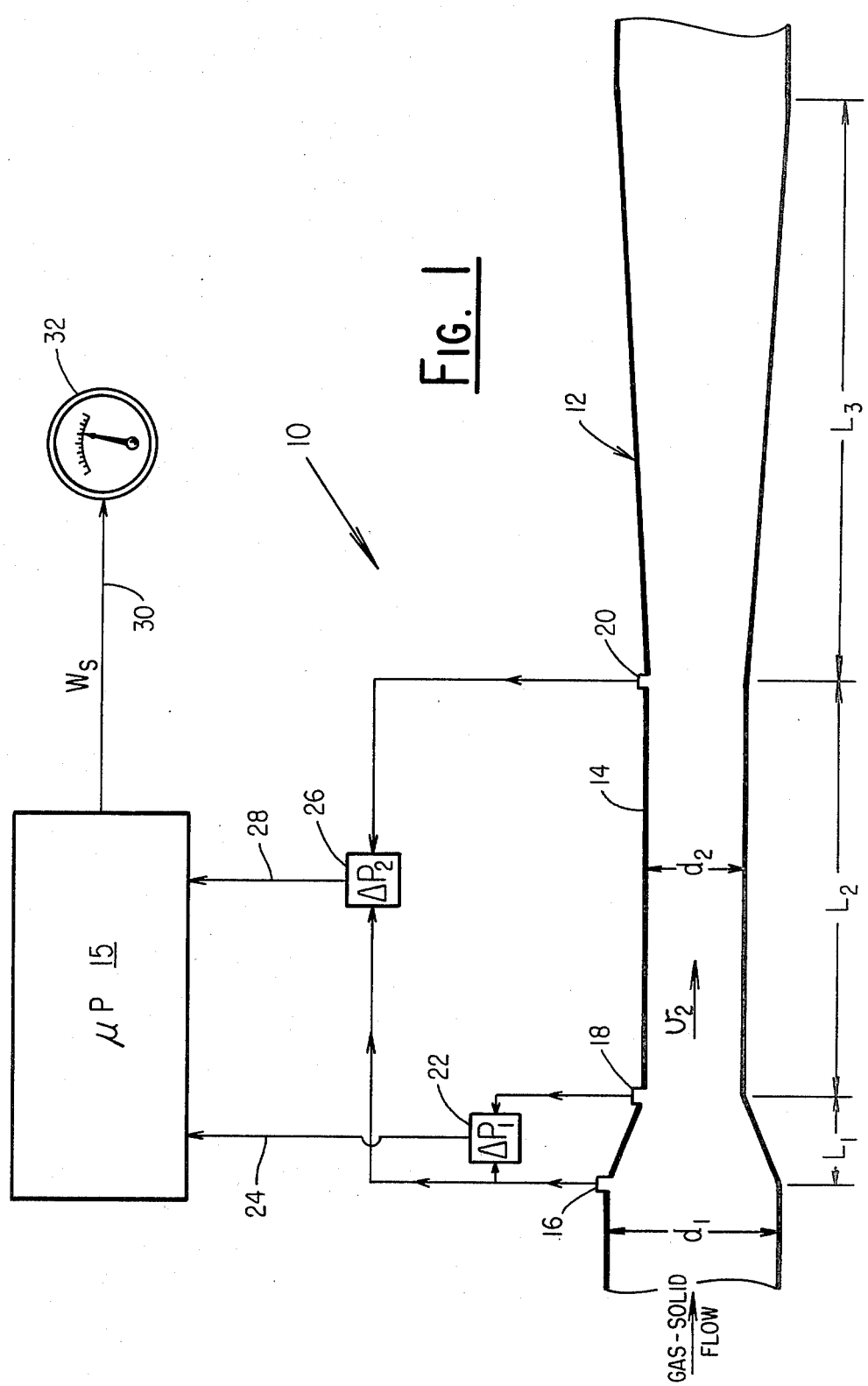
FIG. 1 is a schematic diagram of the entrained solid flow measuring system of the present invention.

Turning now to the drawings wherein the showings are for purposes of illustrating a preferred embodiment of the invention and are not intended to limit the invention thereto, FIG. 1 teaches an entrained solid flow measuring system 10 which includes a venturi tube 12 through which the gas-solid flow is funneled. At the venturi 12 certain pressure measurements are made with the values of these measurements then being transmitted to a microprocessor 15 wherein the measured variables are computed according to a predetermined equation to provide an output signal indicative of solid material flow through the venturi 12.

The venturi 12 has an elongated throat section 14 with three pressure tap points 16, 18, and 20. This type of venturi 12 structure is functionally equivalent to two venturis in series, one with a short throat and the other with a long throat. Thus, the pressure drop between points 16 and 18 corresponds to the throat pressure drop in a short venturi while the pressure drop between points 16 and 20 correspond to the throat pressure drop in a venturi with a longer throat.

It has been found that the dimensions of the venturi 12 are not critical so long as they are generally maintained within certain ranges of values. The nozzle length $L_1$ should not be longer than 6 inches and preferably not more than 1 inch in length. It was found that it can be as short as 0 inches, but in that case, the pressure tap at the end would have to be moved an inch or so downstream so as to correspond to the Vena Contracta. The throat length $L_2$ should not be less than about 6 inches nor more than about 60 inches. It was found that 24 inches was optimum. The approach diameter $d_1$ should not exceed 6 inches and again it was found that 2.5 inches worked very well. The approach diameter $d_1$ can be as small as desired providing that size is consistent with the flow and approach diameters above 20 feet per second. The throat diameter $d_2$ should range from about one-third to two-thirds the value of $d_1$. It was found that a value of $0.58\ d_1$ provided excellent results.

The pressure signals from the pressure taps 16 and 18 are respectively applied to opposite sides of a differential pressure transducer 22 which establishes an output signal along line 24 indicative of the pressure difference between points 16 and 18 in the venturi 12. Similarly, the pressure signals from pressure tap points 16 and 20 are respectively applied to opposite points of a differential pressure transducer 26 which establishes a pressure difference signal along line 28 indicative of the pressure difference in the venturi 12 between points 16 and 20. The aforementioned constantly-monitored pressure difference signals transmitted along lines 24 and 28 are connected to the microprocessor 15 wherein various calculations are done on these two signals, resulting in an output signal along line 30 to an appropriately calibrated indicator 32 which will indicate the amount of solid flow through the venturi 12.

Experimentations with the described venturi 12 resulted in the determination of normal pressure drop relations for pulverized coal in air to be described by the following empirical equations (1) and (2):

$$-\Delta p_1/\rho_g = (a_1 + a_2 m)V_2^n/2g_c \qquad (1)$$

$$-\Delta p_2/\rho_g = (b_1 + b_2 m)V_2^n/2g_c \qquad (2)$$

Where:
$\Delta p_1, \Delta p_2$ = pressure drops; #/ft$^2$
$\rho_g$ = gas density; #/ft$^3$
m = flow ratio; solids:gas, #/#
$V_2$ = Velocity of the gas; ft/sec
$g_c$ = units conversion factor; #mass-ft/#force-sec$^2$
$a_1, a_2, b_1, b_2$, n = empirical constants
n ≈ 2.3

From the foregoing equations, it can be seen that the venturi 12 pressure drop is linear in the ratio of solid flow rate to gas flow rate and is almost quadratic in the velocity of the gas carrying the solid. However, the quadratic relationship was found to be imperfect and the actual exponent on velocity is significantly different from 2.0. The value of 2.3 for n was found to be typical, although slightly different values may be appropriate as the dimensions of the venturi 12 are varied. Likewise, the pressure drop across the throat of the venturi 12 $\Delta p_2$ is also linear in the ratio of solid-flow-to-gas-flow and quasi-quadratic in velocity. However, the proportionality constants are different although the velocity exponent is the same. Equations (1) and (2) may be individually solved for m and $V_2$ respectively and the resulting equations then substituted for m and $V_2$ in the well-known flow equation $$w_s = V_2 \rho_g d_2^2 m\ \pi/4 \qquad (3)$$

combining the constants $a_1, a_2, b_1, b_2$ into new constants $c_1, c_2,$ and $c_3$ will then yield the following equation (4):

$$w_s = \frac{c_3 (\Delta p_1)^{\frac{1}{n}} \left( \frac{\Delta p_2}{\Delta p_1} - c_1 \right)}{\left( c_2 - \frac{\Delta p_2}{\Delta p_1} \right)^{1 - \frac{1}{n}}} \qquad (4)$$

Where:
$\Delta p_1, \Delta p_2$ = pressure drops; #/ft$^2$ $c_1, c_2, c_3$ = constants for a given meter
$w_s$ = solids flow rate; #/sec
n ≈ 2.3
$d_2^2 \pi/4$ = area of venturi throat This equation (4) involves the use of only two pressure differentials $\Delta p_1$ and $\Delta p_2$ variables and four empirical constants $c_1, c_2, c_3$, and n. For a given venturi 12, the values of these constants are determined by empirical calibration.

Figure 2:
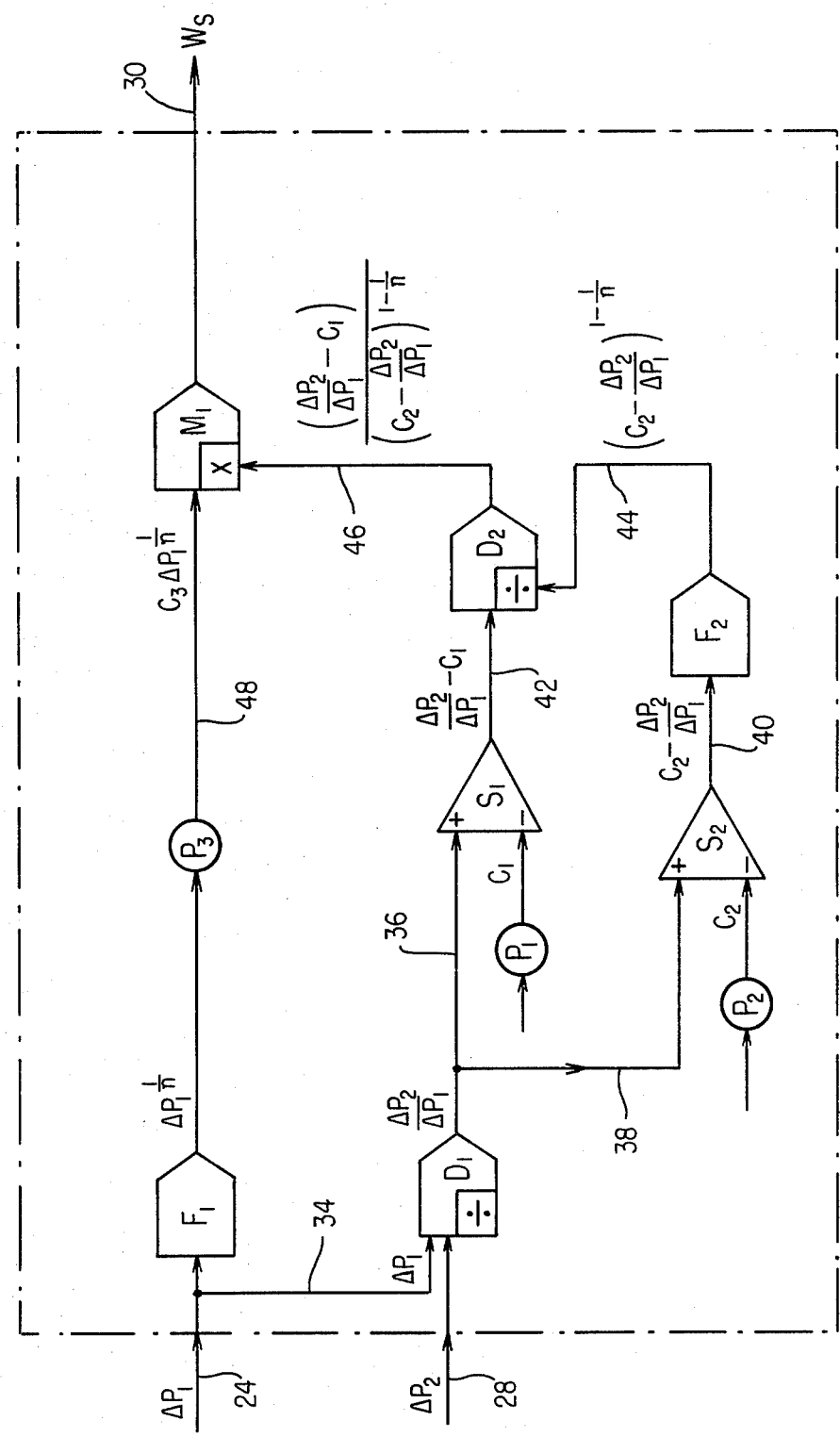
FIG. 2 is a detailed schematic of the computing section of the flow measuring system of FIG. 1.

The equation (4) is programmed for solution in the microprocessor 15 by the connection of elements which may be more easily seen with particular reference to FIG. 2. The differential pressure signal for the difference between the pressure at points 16 and 18 of the venturi 12 is transmitted along line 24 to a function generator $F_1$ and along line 34 to form one input of a divider $D_1$. The output of the function generator $F_1$ is to raise the value of the input to $F_1$ to the 1/n power. Hence, the output of function generator $F_1$ is $\Delta p_1$ to the 1/n power. Meanwhile, the divider $D_1$ also receives a signal along line 28 indicative of the pressure difference between points 16 and 20 of the venturi 12 which is designated as $\Delta p_2$. The divider $D_1$ then produces an output signal which will divide these two inputs or yield an output signal of $\Delta p_2/\Delta p_1$. This output signal from the divider $D_1$ is inputted along lines 36 and 38 to a pair of subtractors, respectively $S_1$ and $S_2$. In the subtractor $S_1$, a signal proportional to the empirical constant $c_1$ is produced by a potentiometer $p_1$ and is inputted into the subtractor $S_1$ in a subtractive or negative manner while the pressure ratio signal along line 36 is fed into the subtractor $S_1$ in an additive manner. As a result, the output of subtractor $S_1$ is $\Delta p_2/\Delta p_1 - C_1$. This result may be seen as being proportional to one term in the numerator of equation (4).

As was mentioned, the output of divider $D_1$ is also fed into subtractor $S_2$ together with a signal proportional to the constant $C_2$ which is provided by a potentiometer $p_2$. The difference signal out of the subtractor $S_2$ is thus $C_2 - \Delta p_2/\Delta p_1$ which signal is inputted into a function generator $F_2$ along line 40. The function generator $F_2$ is made to raise the value of the input to a value of $1 - 1/n$ power. It will be seen that the output of the function generator $F_2$ therefore yields a signal proportional to the term in the denominator of equation (4).

The outputs of the subtractor $S_1$ and the function generator $F_2$ are next inputted into a divider $D_2$ along respective lines 42 and 44, producing an output from the divider $D_2$ which is a ratio of the input terms provided along lines 42 and 44. The output of the divider $D_2$ is then inputted as one input of a multiplier $M_1$ along line 46.

The output of function generator $F_1$ is made to pass through a potentiometer $p_3$ to thereby introduce a constant equivalent to the constant $c_3$ to the output of the function generator $F_1$ and the resulting signal from potentiometer $p_3$ is then also fed into the multiplier $M_1$ along line 48. The signal out of the multiplier $M_1$ is then transmitted along line 30 to the indicator 32 and clearly forms the output of equation (4).

It will be understood that the solving of equation (4) in the microprocessor 15 can be accomplished by a number of other equivalent schematics. For example, the order of division and multiplication can be interchanged without affecting the end result. It will also be understood that the functioning of the analog circuitry can be duplicated by any appropriately-programmed digital microcomputer.

Certain modifications and improvements have been deleted herein for the sake of conciseness and readability. However, it will be understood that all such modifications and improvements are included within the scope of the following claims.

We claim:

1. A system for measuring the flow of solids entrained in a fluid stream comprising:
   a venturi assembly for passing the fluid stream therethrough having a converging section, a constant diameter section, and a diverging section;
   a pair of pressure measuring devices connected to said venturi assembly to measure the pressure drop across different points of said venturi, said first measuring device measuring the pressure drop across the converging section of said venturi assembly and the second measuring device measuring the pressure drop across the converging and the constant diameter section of said venturi assembly; and
   circuit means connected to said pair of pressure measuring devices to calculate the flow of solids through said venturi assembly according to a predetermined equation which is a function of the pressure drops across said venturi.

2. A measuring system as set forth in claim 1 wherein said circuit means includes a microprocessor which calculates the flow of solids as a function of measurements of said first and second differential pressure measuring instruments.

3. A measuring system as set forth in claim 1 wherein said circuit means calculates the flow of solids according to a predetermined equation which is a function of the ratio of the measurements taken by said pair of pressure measuring devices.

4. A measuring system as set forth in claim 3 wherein the predetermined equation is a function of the ratio of the measurements taken by said pair of pressure measuring devices taken to the 2.3 power.

5. A measuring system as set forth in claim 4 wherein the predetermined equation is $$w_s = \frac{c_3 (\Delta p_1)^{\frac{1}{n}} \left( \frac{\Delta p_2}{\Delta p_1} - C_1 \right)}{\left( c_2 - \frac{\Delta p_2}{\Delta p_1} \right)^{1 - \frac{1}{n}}} \tag{4}$$

* * * * *